United States Patent [19]

Takabayashi

[11] Patent Number: 4,645,024
[45] Date of Patent: Feb. 24, 1987

[54] ELECTRICAL POWER STEERING SYSTEM

[75] Inventor: Toshiyuki Takabayashi, Toyota, Japan

[73] Assignee: Aisin Seiki Kabushiki Kaisha, Kariya, Japan

[21] Appl. No.: 776,624

[22] Filed: Sep. 16, 1985

[30] Foreign Application Priority Data

Sep. 21, 1984 [JP] Japan .......................... 59-143880[U]

[51] Int. Cl.$^4$ ............................................. B62D 5/04
[52] U.S. Cl. .................................... 180/79.1; 180/142; 73/862.68
[58] Field of Search ....................... 180/79.1, 142, 132; 73/862.36, 862.68

[56] References Cited

U.S. PATENT DOCUMENTS 3,983,953 10/1976 Bayle .................................. 180/79.1
4,241,804 12/1980 Deininger et al. ................. 180/79.1
4,437,531 3/1984 Urabe ................................. 180/79.1

Primary Examiner—John J. Love
Assistant Examiner—Donn McGiehan
Attorney, Agent, or Firm—Burns, Doane, Swecker & Mathis

[57] ABSTRACT

An accurately operated automotive power steering system comprises a housing, an input shaft, an output shaft, an angular displacement producing mechanism for producing an angular displacement between the input and output shaft according to the torque applied to the input shaft, a sensor for delivering an output corresponding to the angular displacement, and a motor for rotating the output shaft in response to the output from the sensor. One end surface of the input shaft has a tapering recessed surface at its center. Also, the bottom surface of the hole in the output shaft has a tapering recessed surface. A steel ball is sandwiched between these recessed surfaces. A compressed spring is further provided whose one end bears on the input shaft. The other end bears on the inner surface of the housing. The input shaft is pressed against the output shaft via the steel ball.

5 Claims, 7 Drawing Figures

ELECTRICAL POWER STEERING SYSTEM

FIELD OF THE INVENTION

The present invention relates to an automotive power steering system and, more particularly, to an electrical power steering system having a sensor that delivers accurate output signal.

BACKGROUND OF THE INVENTION

A conventional system of this kind is disclosed in Japanese Patent Laid-Open No. 190240/1982 and shown in in FIG. 7, where the system has an input shaft 1 and an output shaft 2. The output shaft 2 has a hole in which one end of the input shaft 1 is fitted such that the shafts 1 and 2 can rotate relative to each other A cylindrical movable member 3 is mounted on the outer periphery of the output shaft 2 so as to be slidable The movable member 3 is provided with slots 3a and 3b extending vertically. Pins 4 and 5 rigidly fixed to the output shaft 2 can fit in the slots 3a and 3b, respectively. Thus, the movable member 3 is able to vertically move relative to the output shaft 2 but unable to rotate relative to the output shaft 2 A pin 6 is firmly fixed to the input shaft 1 and extends through a hole 2a formed in the output shaft 2. the pin 6 is fitted in a slot 3c which is formed in the movable member 3 in a helical direction of the member 3 so that the pin 6 can slide in the slot 3c. When the input shaft 1 makes an angular movement relative to the output shaft 3, the movable member 3 is shifted vertically. A fixed sensor 7 is disposed on the outside of the movable member 3 to detect the vertical position of the member 3. The input shaft 1 and the output shaft 2 are allowed to move vertically, i.e., axially, relative to each other by the pin 6 and the slot 3c.

In the conventional structure constructed as described above, the input shaft 1 and the output shaft 2 vertically move relative to each other because of the clearance between the outer surface of the pin 6 and the lateral sides of the slot 3c, i.e., they rattle. This makes the vertical position of the movable member 3 unstable, thus adversely affecting the output from the sensor 7. If the clearance between the pin 6 and the slot 3c is narrowed to avoid these difficulties, another problem will take place. Specifically, when the input shaft 1 and the output shaft 3 twist relative to each other because of the clearance existing between the mating portions of the shafts 1 and 2, the outer surface of the pin 6 may twist in the slot 3c. This prevents the pin 6 and the movable member 3 from sliding smoothly, thus adversely affecting the output from the sensor 7.

SUMMARY OF THE INVENTION

In view of the foregoing problems with the prior art techniques, it is the main object of the present invention to provide an electrical power steering system in which the input and output shafts do not axially move relative to each other, whereby they do not rattle.

The above object is achieved by a power steering system comprising: a housing; an input shaft rotatably held to the housing via bearings; an ouput shaft rotatably held to the housing via bearings, the output shaft having a hole in which one end of the input shaft is loosely inserted; an angular displacement producing mechanism for producing an angular displacement between the input and output shafts according to the torque applied to the input shaft; a sensor for producing an electrical signal according to said angular displacement, the sensor including a movable member that is displaced axially of the input and output shafts according to said angular displacement, the movable member having a slot in which a pin firmly fixed to the input shaft is inserted so as to be slidable; and an electric motor which receives an input signal corresponding to the output from the sensor and applies a rotating force to the output shaft, whereby the output from the sensor is quite accurate.

In one feature of the invention, one end surface of the input shaft has a tapering recessed surface at its center, and the bottom surface in the hole of the output shaft also has a tapering recessed surface at its center. A steel ball is disposed between the tapering recessed surfaces and contacts the recessed surfaces. A compressed ball is disposed whose one end bears on the input shaft, the other end bearing on the inner surface of the housing via a thrust bearing. Thus, the input shaft is pressed against the output shaft via the steel ball. The housing prevents the output shaft from being axially displaced, making the axial position of the movable member stable. Since the steel ball is pressed against the tapering recessed surfaces of the shafts, both shafts are prevented from twisting. Therefore, the pin fixed to the input shaft smoothly slides within the slot in the movable member, which also smoothly slides on the output shaft. Consequently, the output from the sensor is accurate.

Other objects and features of the invention will appear in the course of the description thereof which follows.

DETAILED DESCRIPTION OF THE INVENTION

Figure 1:
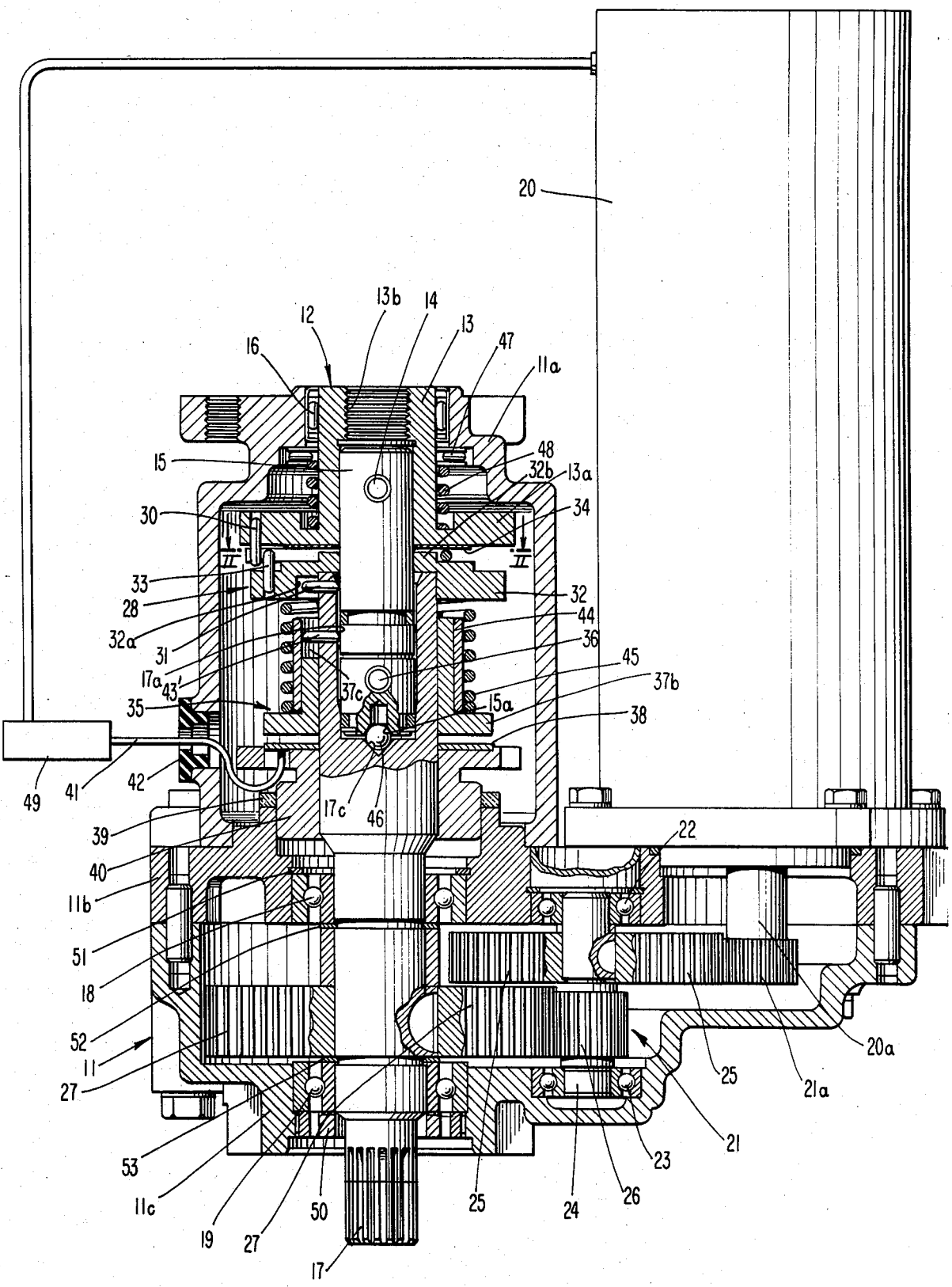
FIG. 1 is a vertical cross section of a power steering system according to the present invention.

Referring to FIG. 1, there is shown a power steering system embodying the concept of the present invention. This system has a housing 11 rigidly attached to a vehicle. The housing 11 consists of separate portions 11a, 11b, and 11c bollted together.

An input shaft 12 is mounted in the housing 11, and consists of a hollow shaft 13 and a solid shaft 15. The shaft 13 has a flange 13a around its lower end. The upper portion of the shaft 15 is fitted in the hole within the hollow shaft 13. The shaft 15 is coupled to the shaft 13 by a pin 14 extending radially through the shafts 13 and 15. The upper portion of the hollow shaft 13 is rotatably held via needle bearings 16 to the housing 11. Splines 13b for connection with the shaft of the steering wheel (not shown) are formed in the upper portion of the hole within the shaft 13.

An output shaft 17 is mounted in the housing 11, and has a hole 17a at its upper end. The lower end of the solid shaft 15 is loosely inserted in the hole 17a. The central and lower portions of the shaft 17 are held to the housing 11 via bearings 18 and 19, respectively, so that the shaft 17 can rotate.

An electric motor 20 is fixedly secured to the housing 11 and has an output shaft 20a. A reduction gearing 21 for transmitting power from the output shaft 20a of the motor 20 to the output shaft 17 is mounted in the lower portion of the inside of the housing 11. The gearing 21 is composed of a gear 21a on the output shaft 20a, gears 25 and 26 on a shaft 24, and a gear 27 on the output shaft 17. The shaft 24 is rotatably held to the housing 11 via ball bearings 22 and 23.

Figure 2:
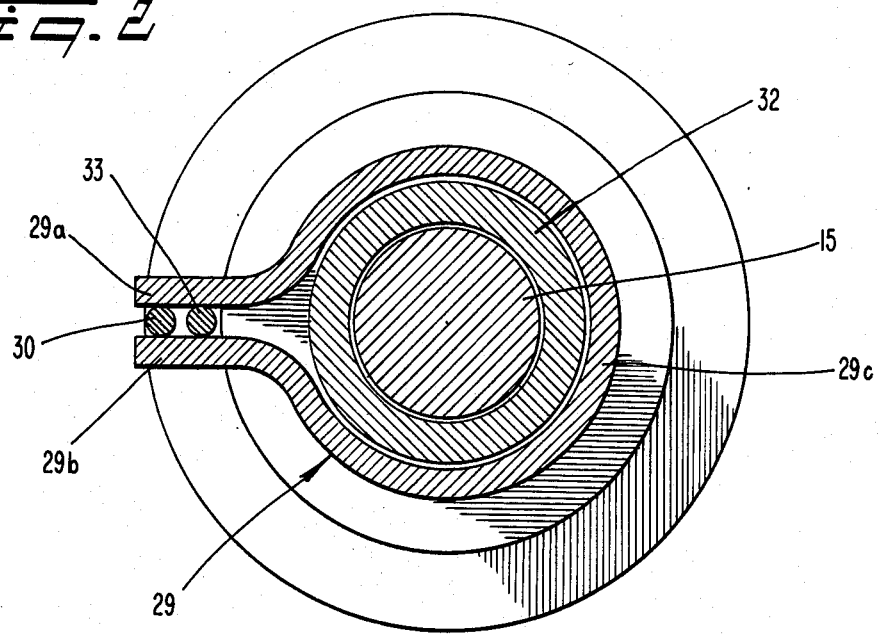
FIG. 2 is a cross-sectional view taken on line II—II of FIG. 1.

An angular displacement producing mechanism 28 for generating an angular displacement between the input and output shafts according to the torque applied to the input shaft is mounted in the upper portion of the inside of the housing 11. As shown in FIG. 2, this mechanism 28 consists of a substantially C-shaped spring 29 made of a material suited for spring, a pin 30 fixed to the flange 13a of the hollow shaft 13, a plate 32 having a groove 32a, and a pin 33 fixed to the plate 32. The spring 29 has straight and parallel end portions 29a and 29b between which the pin 30 is held. A pin 31 rigidly secured to the output shaft 31 is fitted in the groove 32a so as to be vertically slidable. Thus, the plate 32 can rotate with the output shaft 17. The pin 33 is also held between the end portions 29a and 29b of the spring 29, which further has an arc-shaped portion 29c in its center. This arc-shaped portion 29c is guided by a boss 32b formed on the plate 32. A washer 34 is sandwiched between the lower ends of the spring 29 and the hollow shaft 13.

In the angular displacement producing mechanism 28 constructed as described above, when no torque is applied to the input shaft, the spring 29 is restored to its original condition in which its both end portions hold the pins 30 and 33 therebetween and are closest to each other. At this time, the input shaft 12 and the output shaft 17 are not angularly displaced from each other. When torque is applied to the input shaft, the both end portions 29a and 29b of the spring 29 are moved away from each other. Then, the resilient deformation of the spring 29 produces an angular displacement between the input shaft 12 and the output shaft 17 according to the torque.

Figure 3:
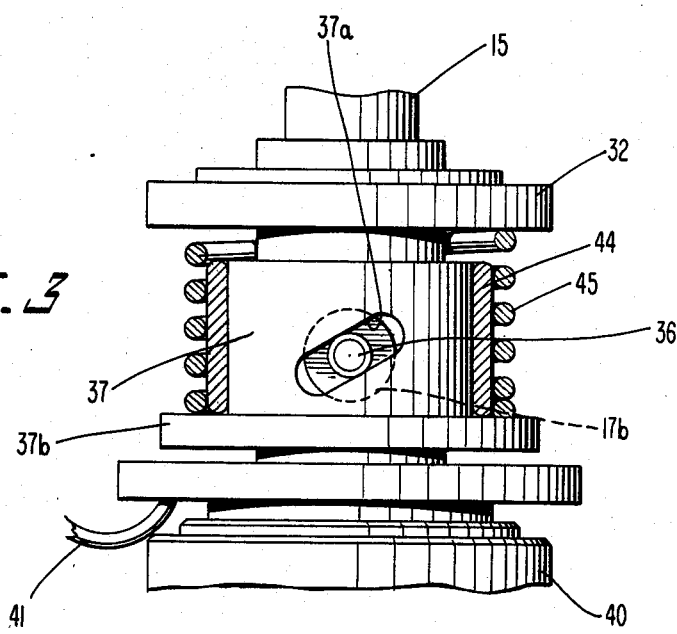
FIG. 3 is a side elevation of a sensor 35 incorporated in the system shown in FIG. 1, for showing its appearance.

Disposed below the angular displacement producing mechanism 28 is a sensor 35 which, as shown in FIGS. 1 and 3, mainly consists of a pin 36 firmly fixed to the lower end of the hollow shaft 15 of the input shaft 12, a movable member 37 having a slot 37a, and a fixed electrode plate 38 opposed to a flange 37b formed around the lower end of the movable member 37. The pin 36 extends radially through the hole 17b formed in the output shaft 17, and is fitted in the slot 37a so as to be slidable. The movable member 37 is fitted over the upper end portion of the output shaft 17 so as to be slidable. The sensor 35 acts to convert the angular displacement between the shafts 12 and 17 into the electrostatic capacitance between the movable member 37, or one electrode, and the fixed electrode plate 38. The electrode plate 38 is fixed to a support member 40, which is screwed into the housing 11 and secured to the housing 11 by a lock nut 39. The vertical position of the electrode plate 38 can be adjusted by loosening the nut 39 and rotating the support member 40.

Figure 4:
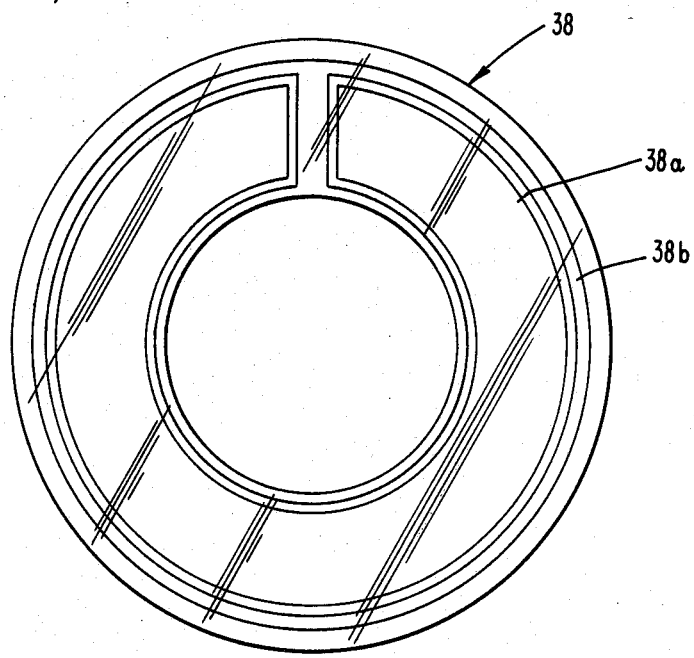
FIG. 4 is a plan view of a fixed electrode 38 incorporated in the system shown in FIG. 1.

The fixed electrode plate 38 is a substrate made from an insulating material and has a pattern shown in FIG. 4 on its face. As shown in FIG. 4, the plate 38 has an electrode portion 38a and a peripheral electrode portion 38b that shields the electrode portion 38a. The electrode portion 38a and the peripheral electrode portion 38b are brought out from a lead sealing body 42 by an electrostatically shielded lead wire 41 and connected to a controller 49.

The movable member 37 has a vertically extending slot 37c in which a pin 43 is fitted so as to be slidable. The pin 43 is fixed to the output shaft 17 and extends radially. The movable member 37 is allowed to be vertically displaced relative to the output shaft 17 but is not allowed to rotate by the action of the pin 43 and the slot 37c. The slot 37a in the movable member 27 extends in a helical direction. When the input shaft 12 and the output shaft 17 are not displaced relative to each other, the pin 36 is located at the center of the slot 37a. When they are displaced, the outer surface of the pin 36 comes into contact with one side surface of the slot 37a, producing a cam action. Then, the movable member 37 is displaced upward or downward on the output shaft 17 according to the angular displacement between the input and output shafts. As a result, the distance between the flange 37b and the fixed electrode plate 38 varies.

Figure 5:
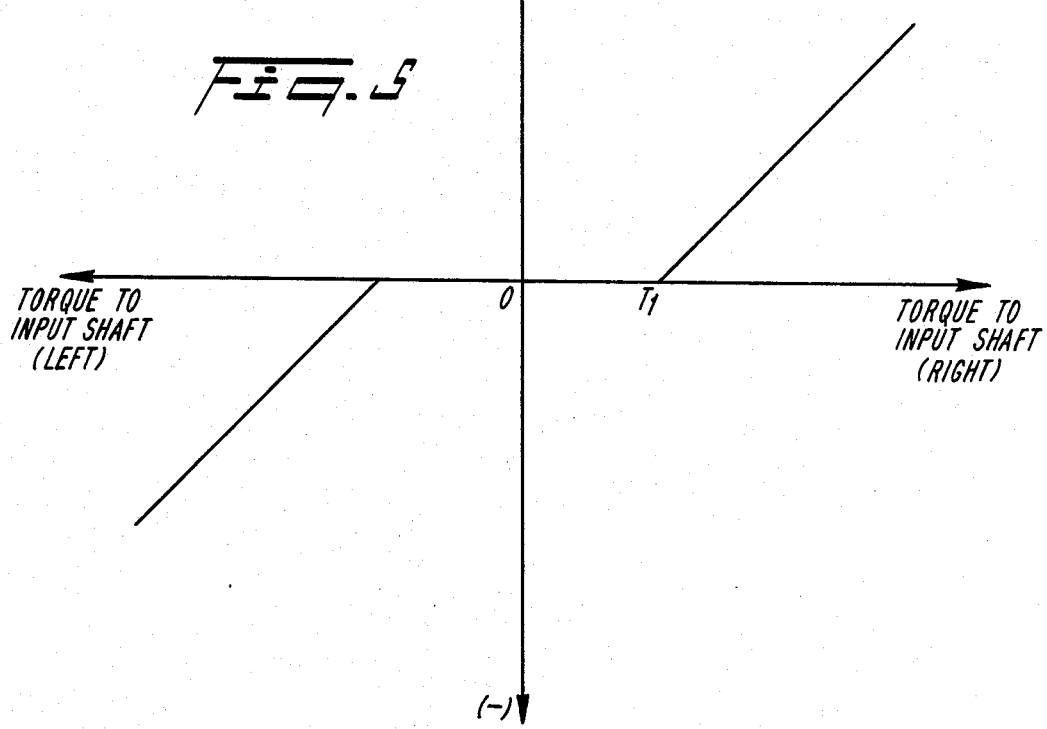
FIG. 5 is a graph showing the relation of the displacement of a movable member 37 to the torque applied to the input shaft.

FIG. 5 shows the relation of the vertical displacement of the movable member 37 to the torque applied to the input shaft. As can be seen from this graph, when the torque is less than $T_1$, the spring 29 of the angular displacement producing mechanism 28 does not resiliently deform, whereby the movable member 37 is not displaced. A cylinder 44 is fitted over the movable member 37 to prevent the pins 36 and 43 from coming off.

Figure 6:
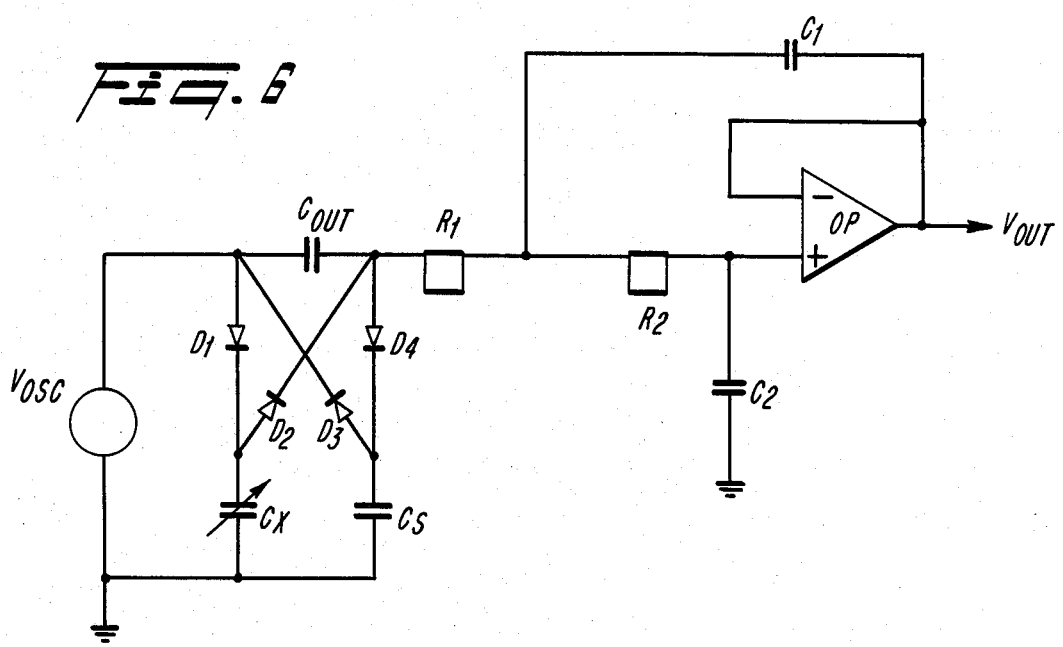
FIG. 6 is a diagram of a circuit for converting the output from the sensor 35 into a voltage difference.

FIG. 6 shows a circuit for converting the electrical signal from the sensor 35 into a voltage difference. The output of positive and negative polarities from an oscillator $V_{osc}$ is supplied through diodes $D_1$ and $D_3$ so that an electrostatic capacitance $C_4$ is developed between the fixed electrode plate 38 and the flange 37b of the movable member 37. Further, a reference capacitor $C_s$ is charged through the diodes $D_1$ and $D_3$. Then, a capacitor $C_{out}$ is charged through diodes $D_2$ and $D_4$ by the capacitance $C_x$ and the charged capacitor $C_s$. Since the capacitance $C_x$ and the charge on the reference capacitor $C_s$ are opposite in polarity, the electric charge stored on the capacitor $C_{out}$ is equal to the difference between them. The output voltage from the capacitor $C_{out}$ is applied to a low-pass filter, or operational amplifier OP, that acts as a buffer amplifier. Thus, the change in the electrostatic capacitance which is obtained by the sensor 35 is delivered as a voltage difference from the amplifier OP.

In order to prevent the clearance between the outer periphery of the pin 36 fixed to the input shaft 12 and the side wall of the slot 37a in the movable member 37 from adversely affecting the correspondence between the angular displacement of the output shaft 17 relative to the input shaft 12 and the vertical displacement of the movable member 37, a compressed spring 45 is mounted between the flange 37b of the movable member 37 and the plate 32. The spring 45 biases the movable member 37 downward to bring the outer periphery of the pin 36 into contact with only the upper side surface of the slot 37a.

The lower end surface of the solid shaft 15 of the input shaft 12 has the tapering recessed portion 15a at its center. Also, the bottom surface of the hole 17a in the output shaft 17 has the tapering recessed portion 17c at its center. The steel ball 46 is held between the recessed portions 15a and 17c. The upper end of the compressed spring 48 bears on the inner surface of the housing 11 via a needle bearing or thrust bearing 47 above the flange 13a of the hollow shaft 13 of the input shaft 12. The lower end of the spring 48 bears on the flange 13a. The input shaft 12 is pressed against the output shaft 17 via the ball 46. Thus, relative vertical displacement between the input shaft 12 and the output shaft 17 is prevented, i.e., they do not rattle. Further, they are prevented from twisting, though there exists a clearance between the mating portions of the shafts 12 and 17; otherwise, the pin 36 would not smoothly slide in the slot 37a, or the parallel relation between the flange 37b of the movable member 37 and the fixed electrode plate 38 would not be maintained. Also shown in FIG. 1 are a retaining ring 50 screwed into the housing 11, and snap rings 51, 52, 53.

The operation of the electrical power steering system constructed as described above is now briefly described. When a torque is applied to the input shaft 12, the angular displacement producing mechanism 28 produces an angular displacement between the input shaft 12 and the output shaft 17 according to the torque. This angular displacement is converted into an electrostatic capacitance between the movable member 37 and the fixed electrode 38 by the sensor 35. The resulting electrical signal is furnished to the controller 49, which then supplies a current corresponding to its input signal to the motor 20. As a result, the motor 20 transmits a rotating force to the output shaft 17 via the reduction gearing 21.

Figure 7:
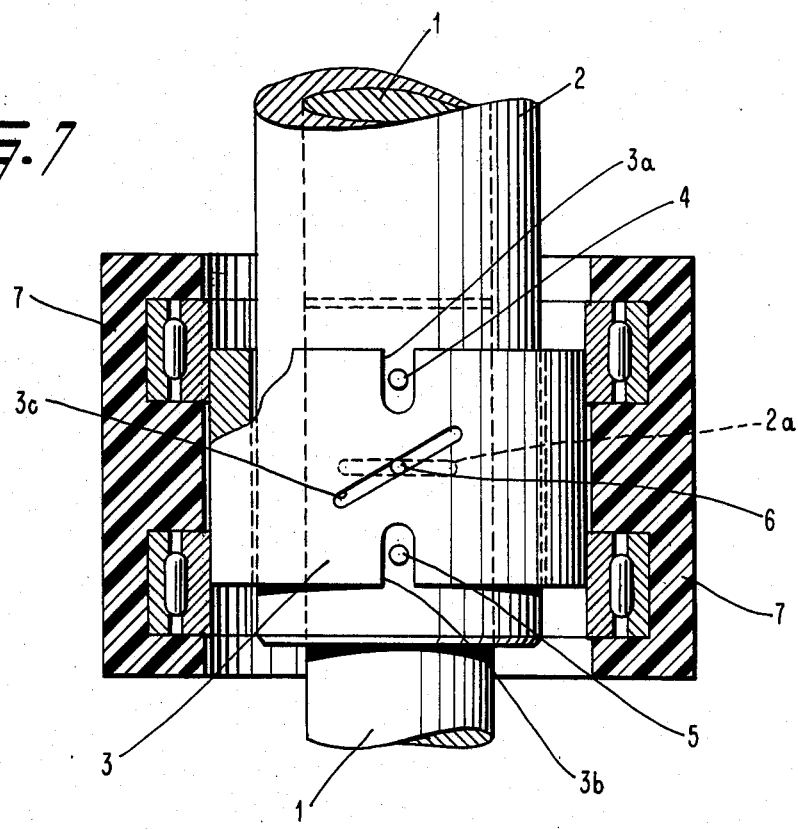
FIG. 7 is a fragmentary cutaway view of a conventional power steering system.

It is to be understood that the present invention is not limited to the above-described example, in which the sensor 35 employs electrostatic capacitance. For example, the sensor as shown in FIG. 7 may also be used.

As described thus far, the novel power steering system has a sensor which delivers more accurate output signal than conventional. Hence, the electrical power steering system has improved performance.

What is claimed is:

1. An electrical power steering system comprising:
   a housing;
   an input shaft rotatably held to the housing via bearings;
   an output shaft rotatably held to the housing via bearings, the output shaft having a hole in which one end of the input shaft is loosely mounted;
   an angular displacement producing mechanism for producing an angular displacement between the input and output shafts according to the torque applied to the input shaft;
   a sensor for producing an electrical signal corresponding to said angular displacement, the sensor including a movable member which is displaced axially of the input and output shafts according to the angular displacement, the movable member having a slot in which a pin firmly fixed to the input shaft is inserted so as to be slidable;
   an electric motor which receives an electrical input corresponding to the output from the sensor and which imparts a rotating force to the output shaft;
   one end surface of the input shaft having a tapering recessed surface at its center, the bottom surface of the hole in the output shaft also having a tapering recessed surface at its center;
   a steel ball disposed between the tapering recessed surfaces so as to contact these recessed surfaces; and
   a compressed spring whose one end bears on the input shaft, the other end bearing on the inner surface of the housing via a thrust bearing, whereby the input shaft is pressed against the output shaft via the steel ball.

2. An electrical power steering system according to claim 1, wherein said angular displacement producing mechanism includes a spring made from a material suited for spring and a pair of protrusions, the spring having a pair of end portions extending radially of the input and output shafts, the spring further having an arc-shaped intermediate portion extending circumferentially of the input and output shafts, said protrusions being designed to rotate with the input shaft and the output shaft, respectively, the protrusions extending axially of the input and output shafts between both ends of the spring, the torque applied to the input shaft acting to pull both ends of the spring away from each other.

3. An electrical power steering system according to claim 1, wherein said electric motor is fixed to the housing, and wherein the output shaft of the motor is connected to the output shaft via a reduction gearing.

4. An electrical power steering system according to claim 1, wherein said sensor includes a fixed electrode plate opposed to a flange formed at one end of the movable member, and wherein the sensor converts the angular displacement between the input and output shafts into the electrostatic capacitance between the movable member and the fixed electrode plate to detect the angular displacement.

5. An electrical power steering system according to claim 4, wherein said fixed electrode plate is fixed to a support member screwed into the housing, and wherein the distance between the fixed electrode plate and the flange of the movable member can be adjusted.

* * * * *